(12) United States Patent
Yoneyama (10) Patent No.: US 7,791,824 B2
(45) Date of Patent: Sep. 7, 2010

(54) TELEPHOTO LENS SYSTEM

(75) Inventor: Shuji Yoneyama, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/424,004

(22) Filed: Apr. 15, 2009

(65) Prior Publication Data

US 2009/0262439 A1 Oct. 22, 2009

(30) Foreign Application Priority Data

Apr. 21, 2008 (KR) .................. 10-2008-0036871

(51) Int. Cl.
*G02B 13/02* (2006.01)
(52) U.S. Cl. ...................... 359/745; 359/748
(58) Field of Classification Search .............. 359/745, 359/746, 747, 748
See application file for complete search history.

(56) References Cited

U.S. PATENT DOCUMENTS

| | | | | |
|---|---|---|---|---|
| 4,852,984 | A | * | 8/1989 | Takahashi et al. ........... 359/748 |
| 2005/0248857 | A1 | * | 11/2005 | Wada ........................ 359/748 |

FOREIGN PATENT DOCUMENTS

| | | |
|---|---|---|
| JP | 03-200909 A | 9/1991 |
| JP | 07-199066 A | 8/1995 |

* cited by examiner

*Primary Examiner*—Scott J Sugarman
(74) *Attorney, Agent, or Firm*—Drinker Biddle & Reath LLP (57) ABSTRACT

Provided is a telephoto lens system. The telephoto lens system includes a first lens group having a positive refractive power, a second lens group having a negative refractive power, and a third lens group having a positive refractive power, which are arranged sequentially from an object side to an image side. Focusing is performed by moving the second lens group along an optical axis. The first lens group comprises (from object to image side) a positive lens having an object side surface whose radius of curvature is greater than that of an image side surface, a positive meniscus lens having a convex surface at the object side, a negative meniscus lens having a convex surface at the object side, and a positive lens having an object side surface whose radius of curvature is greater than that of an image side surface. The second lens group comprises (from object to image side) a doublet lens made up of a positive lens and a negative lens, and the third lens group comprises a doublet lens made up of a negative lens with a concave surface at the object side and a positive lens, and a positive lens.

8 Claims, 8 Drawing Sheets

TELEPHOTO LENS SYSTEM

CROSS-REFERENCE TO RELATED PATENT APPLICATION

This application claims the benefit of Korean Patent Application No. 10-2008-0036871, filed on Apr. 21, 2008, in the Korean Intellectual Property Office, the disclosure of which is incorporated herein in its entirety by reference.

BACKGROUND OF THE INVENTION

1. Field of the Invention

The present invention relates to a camera lens system, and more particularly, to a telephoto lens system for forming the image of an object on an image plane.

2. Description of the Related Art

Recently, digital cameras or video cameras including a solid-state imaging device such as a charge coupled device (CCD) or a complementary metal-oxide semiconductor (CMOS) have been widely used. In particular, the demands for megapixel camera modules have increased, and compact digital cameras with more than 5 million pixels and high quality have been developed. There are still demands for smaller, lighter, and cheaper optical image forming apparatuses such as digital cameras or mobile phone cameras using a solid-state imaging device such as a CCD or a CMOS.

In video cameras or digital cameras, bright telephoto lenses having a low f-number (Fno) are preferred. However, such bright telephoto lenses are large and heavy, and auto-focus cameras with low f-number have a particularly slow focusing speed. To solve the problems, many attempts have been made. For example, a lens system has been disclosed that includes a front lens group and a rear lens group, and moves only the rear lens group. The rear lens group of this lens system acts as a focusing lens group consisting of 5 bright lenses each having an F-number of 1.4, to reduce the weight of the focusing lens group. However, since the 5 bright lenses constitute the focusing lens group, there is a limitation in reducing the weight of the focusing lens group. As another example, a lens system has been disclosed that performs inner focusing by using a focusing lens group including 5 bright lenses each having an F-number of 1.4 to reduce the weight of the focusing lens group. However, since the 5 bright lenses constitute the focusing lens group, there is also a limitation in reducing the weight of the focusing lens group.

SUMMARY OF THE INVENTION

The present invention provides a bright telephoto lens system that can reduce the weight of a focusing lens group by allowing the focusing lens group to include a smaller number of lenses that can perform inner focusing suitable for an auto-focus camera.

According to an aspect of the present invention, there is provided a telephoto lens system comprising a first lens group having a positive refractive power, a second lens group having a negative refractive power, and a third lens group having a positive refractive power, which are arranged sequentially from an object side, wherein the first lens group comprises three positive lenses and one negative lens, the second lens group comprises a doublet lens made up of a positive lens and a negative lens, and the third lens group comprises a doublet lens made up of a negative lens with a concave surface toward the object side and a positive lens, and a positive lens, which are arranged sequentially from the object side, the telephoto lens system satisfying $$0.450 < f_3/f < 0.630$$

where f denotes the focal length of the telephoto lens system when the telephoto lens system is focused on an object at an infinite distance, and $f_3$ denotes the focal length of the third lens group.

The telephoto lens system may satisfy $$0.35 < \frac{1}{f}\left|\frac{n_{3-1} - 1}{r_{3-1}}\right| < 2.30$$

where $n_{3-1}$ denotes the refractive index of the negative lens of the third lens group which is closest to the object side, and $r_{3-1}$ denotes the radius of curvature of the concave surface toward the object side of the negative lens of the third lens group which is closest to the object side.

The first lens group may comprise a positive lens having an object side surface whose curvature is greater than that of an image side surface, a positive meniscus lens having a convex surface at the object side, a negative meniscus lens having a convex surface at the object side, and a positive lens having an object side surface whose curvature is greater than that of an image side surface, which are arranged sequentially from the object side.

The telephoto lens system may satisfy $$0.35 < \frac{|f_2|}{f} < 0.65$$

where $f_2$ denotes the focal length of the second lens group.

When np denotes the refractive index of each of the three positive lenses of the first lens group, each of the three positive lenses may comprise, without any overlap, one of three materials respectively satisfying 1.42<np<1.50, 1.55<np<1.65, and 1.70<np<1.85.

Focusing may be performed by moving the second lens group along an optical axis.

According to another embodiment of the present invention, there is provided a telephoto lens system comprising a first lens group having a positive refractive power, a second lens group having a negative refractive power, and a third lens group having a positive refractive power, which are arranged sequentially from an object side, wherein focusing is performed by moving the second lens group along an optical axis, the first lens group comprises a positive lens having an object side surface whose curvature is greater than that of an image side surface, a positive meniscus lens having a convex surface at the object side, a negative meniscus lens having a convex surface at the object side, and a positive lens having an object side surface whose curvature is greater than that of an image side surface, which are arranged sequentially from the object side, the second lens group comprises a doublet lens made up of a positive lens and a negative lens, and the third lens group comprises a doublet lens made up of a negative lens with a concave surface at the object side and a positive lens, and a positive lens, which are arranged sequentially from the object side.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

The present invention relates to a photographing lens used in an electronic still camera, a video camera, or the like, and more particularly, to a telephoto lens system that can perform inner focusing that is suitable for an auto-focus camera.

Figure 1:
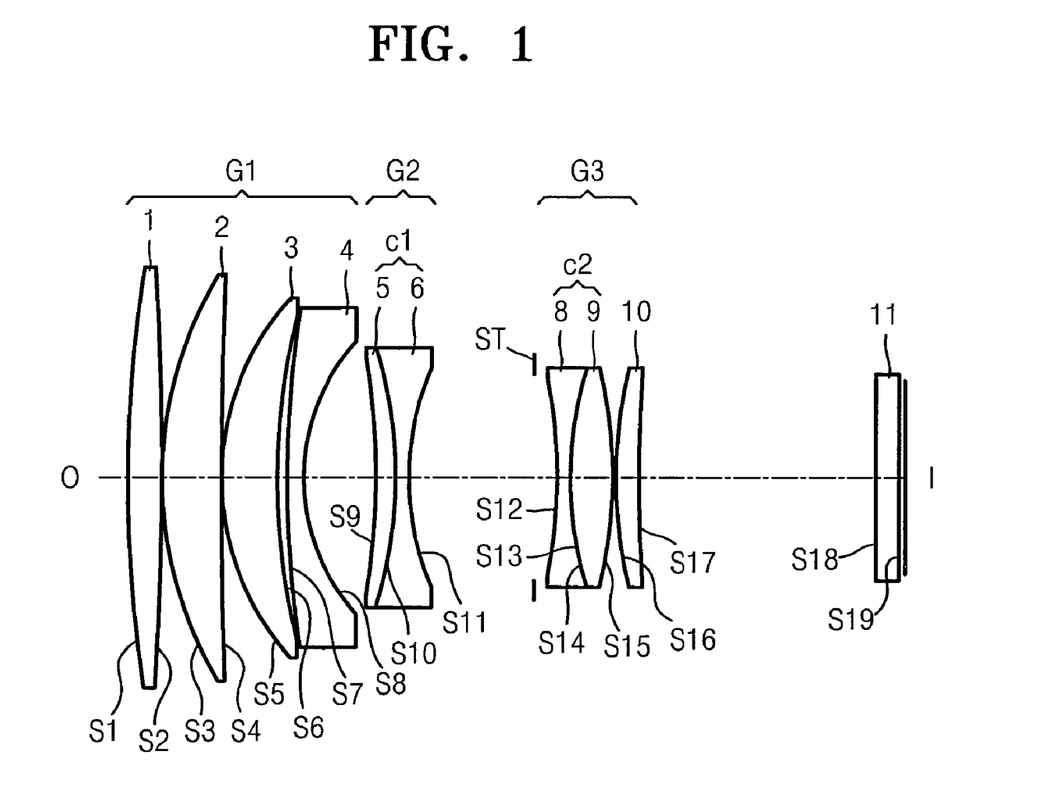
FIG. 1 is a cross-sectional view of a lens system according to an embodiment of the present invention.

FIG. 1 is a cross-sectional view of a telephoto lens system according to an embodiment of the present invention. Referring to FIG. 1, the telephoto lens system includes a first lens group G1 having a positive refractive power, a second lens group G2 having a negative refractive power, and a third lens group G3 having a positive refractive power, which are arranged sequentially in this order from an object side O. Also, focusing is performed by moving the second lens group G2 along an optical axis.

Figure 4:
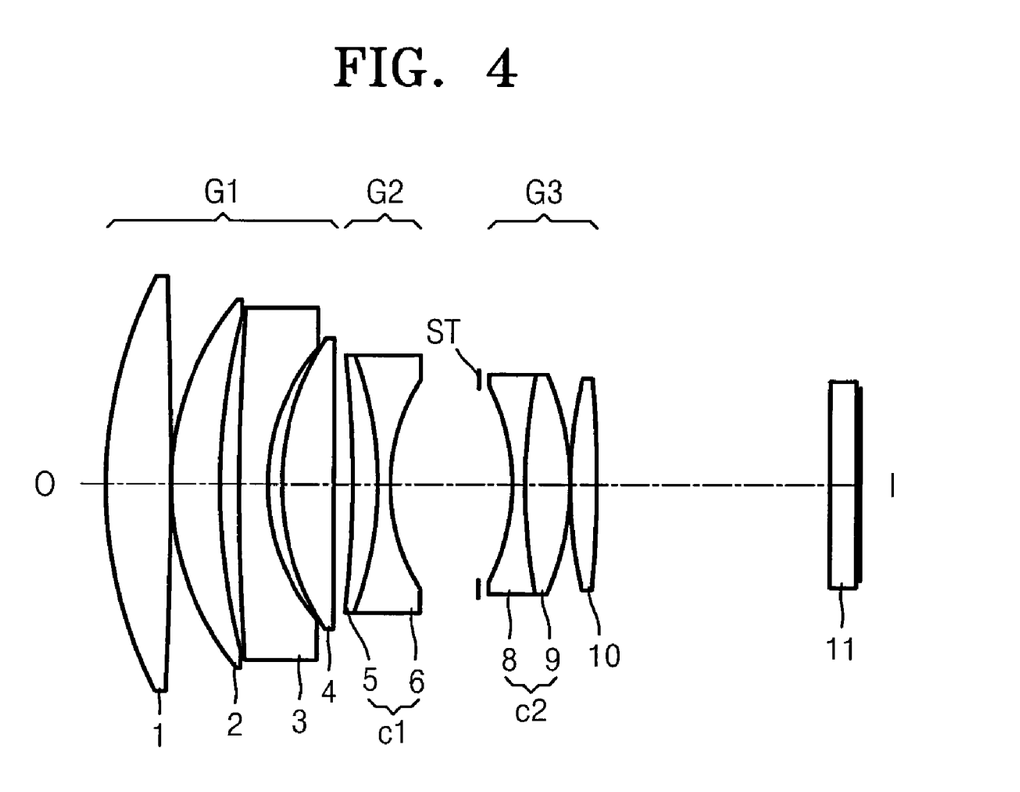
FIG. 4 is a cross-sectional view of a lens system according to another embodiment of the present invention.
Figure 7:
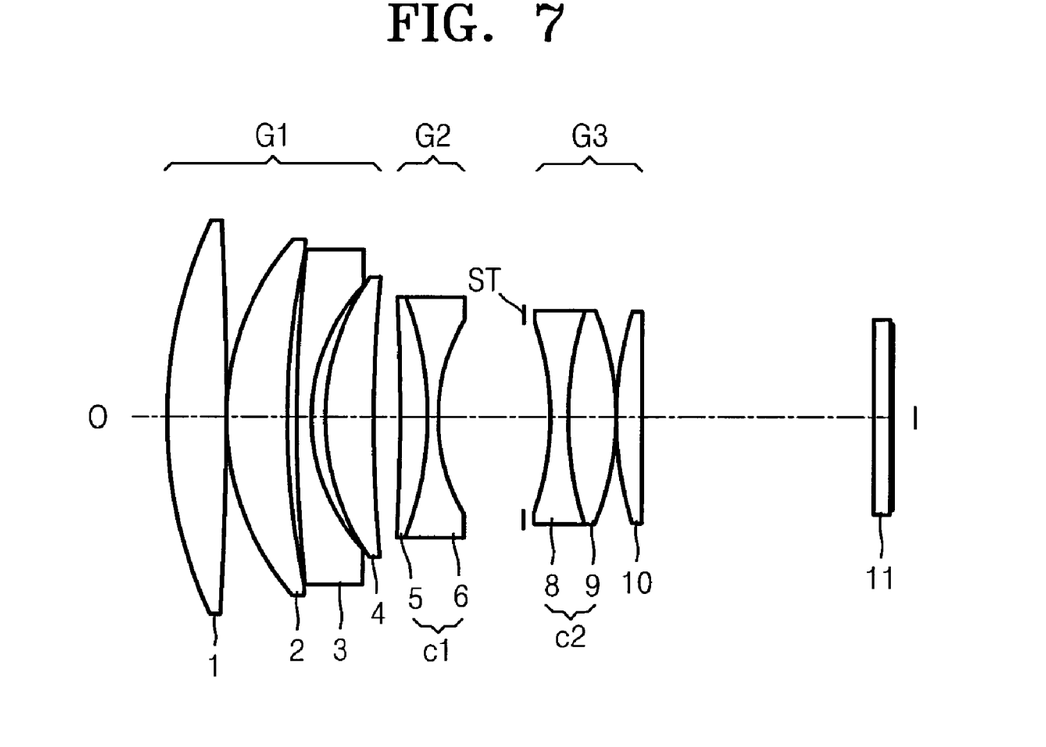
FIG. 7 is a cross-sectional view of a lens system according to another embodiment of the present invention.
Figure 10:
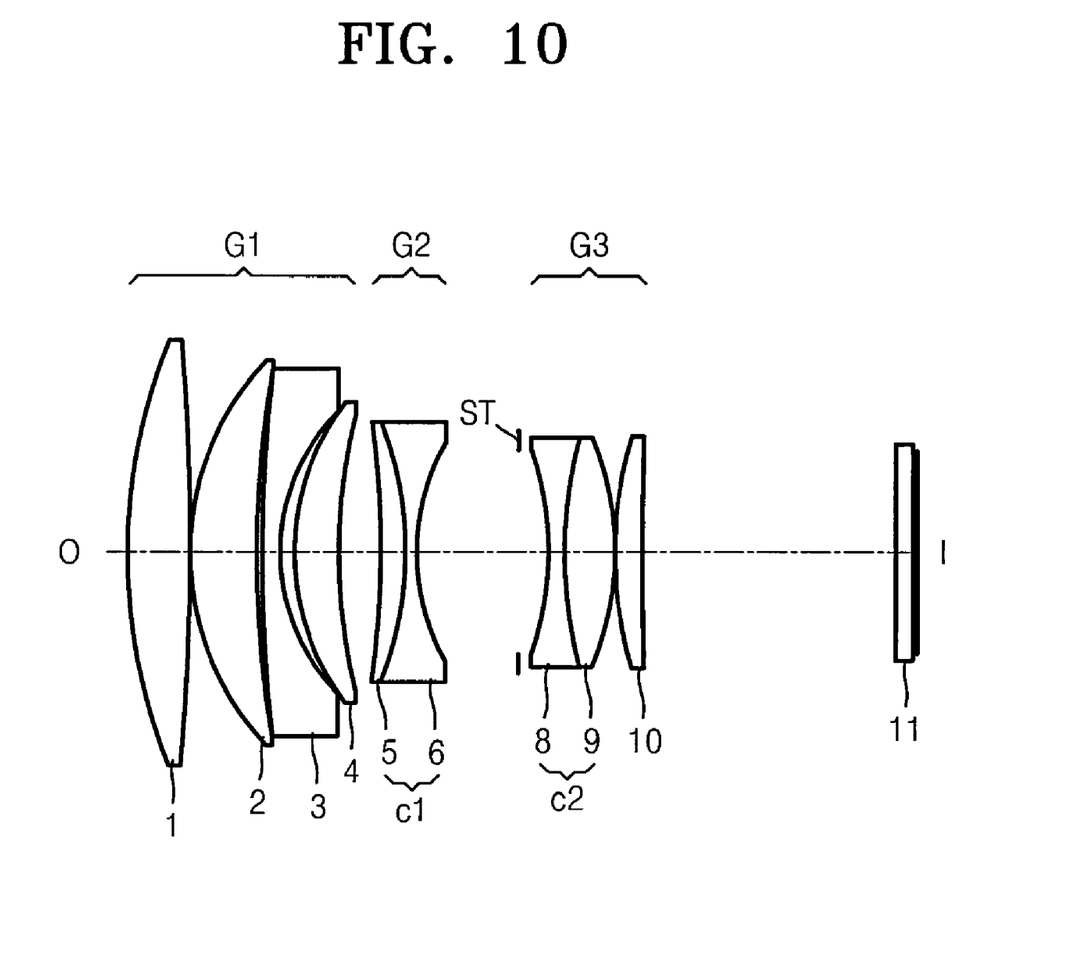
FIG. 10 is a cross-sectional view of a lens system according to another embodiment of the present invention.

The first lens group G1 includes three positive lenses and one negative lens. The second lens group G2 includes a doublet lens C1 made up of a positive lens and a negative lens. The third lens group G3 includes a doublet lens C2 made up of a negative lens with a concave surface toward the object side O and a positive lens, and a positive lens which are arranged sequentially from the object side O. For example, the first lens group G1 may include first through fourth lenses 1 through 4 respectively having positive, positive, positive, and negative refractive powers as shown in FIG. 1, or may include first through fourth lenses 1 through 4 respectively having positive, positive, negative, and positive refractive powers as shown in FIGS. 4, 7, and 10. The second lens group G2 may include the doublet lens C1 made up of a fifth lens 5 having a positive refractive power and a sixth lens 6 having a negative refractive power. The third lens group G3 may include the doublet lens C2 made up of a seventh lens 8 having a negative refractive power and an eighth lens 9 having a positive refractive power, and a ninth lens 10 having a positive refractive power. The third lens group G3 further includes a stop ST disposed in front of the seventh lens 8.

As a focal length increases, the length of the entire lens system tends to increase, and as an F-number (Fno) decreases, that is, an aperture increases, the weight of the lens system tends to increase. In this case, inner focusing suitable for an auto-focus camera may be performed by moving the second lens group G2 including only the doublet lens C1 that is made up of the positive lens 5 and the negative lens 6. In order to perform focusing by moving the second lens group G2, aberration occurring in the first lens group G1 and the third lens group G3 should be corrected. The first lens group G1 includes three positive lenses and one negative lens in order to correct aberration. Accordingly, chromatic aberration, spherical aberration, comma, and astigmatism at a telephoto position can be well corrected. Since the third lens group G3 includes the doublet lens C2 made up of the negative lens 8 with the concave surface toward the object side O and the positive lens 9 and the positive lens 10, spherical aberration caused by a large aperture and the concave surface of the negative lens 8 can be well corrected.

The lens system of FIG. 1 satisfies $$0.450 < f_3/f < 0.630 \qquad (1)$$

where f denotes the focal length of the lens system when the lens system is focused on an object at an infinite distance, and f3 denotes the focal length of the third lens group G3.

Inequality 1 shows a ratio of the focal length of the third lens group G3 to the focal length of the lens system. Referring to Inequality 1, since the third lens group G3 has a relatively short focal length, strong power can be obtained. When the third lens group G3 satisfies Inequality 1, spherical aberration or comma caused by the bright lenses can be well corrected such that the total length of the lens system can be maintained constant while a sufficient amount of movement for a focusing lens can be secured in the lens system. For example, the lens system of FIG. 1 may have an F-number (Fno) of approximately 1.4, and may correct spherical aberration or comma caused by the low F-number. If the ratio $f_3/f$ is higher than the upper limit of Inequality 1 and thus the power of the third lens group G3 is reduced, aberration occurring in the third lens group G3 cannot be balanced with aberration occurring in the second lens group G2, thereby failing to well correct spherical aberration caused by a large aperture, and also a back focal length is increased, thereby increasing the diameter of the first lens group G1 or the third lens group G3. Once the lens system increases in size accordingly, the weight of the lens system is increased. Accordingly, the large lens system may not be able to be mounted on a camera mount of a single lens reflex camera.

If the ratio $f_3/f$ is lower than the lower limit of Inequality 1 and thus the power of the third lens group G3 is increased, aberration occurring in the third lens group G3 cannot be balanced with aberration occurring in the second lens group G2, thereby increasing negative spherical aberration or reducing a back focal length during usage in a single lens reflex camera.

The refractive power of the concave surface toward the object side O of the third lens group G3 will now be explained.

$$0.35 < f \left| \frac{n_{3-1} - 1}{r_{3-1}} \right| < 2.30 \quad (2)$$

where $n_{3-1}$ denotes the refractive index of the negative lens 8 of the third lens group G3 which is closest to the object side O, and $r_{3-1}$ denotes the radius of curvature of the concave surface toward the object side O of the negative lens 8 of the third lens group G3 which is the closest to the object side O. Here, the refractive index of the negative lens 8 may be a refractive index at a d-Line. If a ratio of Inequality 2 is satisfied, strong negative spherical aberration caused by the large aperture and the concave surface toward the object side O of the third lens group G3 is corrected. If the ratio of Inequality 2 is lower than the lower limit of Inequality 2 and thus power is reduced, spherical aberration is not sufficiently corrected, resulting in negative spherical aberration and comma. If the ratio of Inequality 2 is higher than the upper limit of Inequality 2 and thus power is increased, spherical aberration is excessively corrected, high order spherical aberration is caused, resulting in bad Bokeh characteristics, and manufacturing sensitivity is increased.

The absolute value of the focal length of the second lens group G2 will now be explained.

$$0.35 < \frac{|f_2|}{f} < 0.65 \quad (3)$$

where $f_2$ denotes the focal length of the second lens group G2. If the focal length of the second lens group G2 is lower than the lower limit of Inequality 3 and thus the power is increased, aberration occurring in the doublet lens C1 made up of the positive lens 5 and the negative lens 6 cannot be sufficiently corrected, and the aberration occurring in the second lens group G2 cannot be balanced with aberration occurring in the first lens group G1. If the focal length of the second lens group G2 is higher than the upper limit of Inequality 3 and thus power is reduced, aberration can be corrected with only the doublet lens C1, but the amount of movement, during focusing, from the object at the infinite distance to a closest focusing distance is increased and it is difficult to reduce the total length of the lens system.

Materials of the lenses 1 through 4 constituting the first lens group G1 will now be explained.

When np denotes the refractive index of each of the three positive lenses 1 through 3 of the first lens group G1, each of the three positive lenses 1 through 3 includes, without any overlap, one of three materials respectively satisfying the following three inequalities. For example, the refractive index may be a refractive index at a d-Line.

$$1.42 < np < 1.50 \quad (4)$$

$$1.55 < np < 1.65 \quad (5)$$

$$1.70 < np < 1.85 \quad (6)$$

In a large aperture telephoto lens system, it is important to correct chromatic aberration and spherical aberration caused by a large aperture. In general, a material having a high Abbe number, particularly, having a high Abbe number and anomalous dispersion, is effective to correct chromatic aberration. A material having a high refractive index is effective to correct spherical aberration. However, since a glass having a high Abbe number and anomalous dispersion has a low refractive index and a glass having a high refractive index has a low Abbe number, it is difficult to find a material having both a high Abbe number and a high refractive index. Accordingly, a material may be properly selected according to purposes. For example, when a glass having a high Abbe number and anomalous dispersion is necessary in order to correct chromatic aberration, a material satisfying Inequality 4 may be selected. When a glass having a relatively high refractive index and anomalous dispersion is necessary, a material satisfying Inequality 5 may be selected. When a glass having a high refractive index is necessary in order to sufficiently correct spherical aberration, a material satisfying Inequality 6 may be selected.

The configuration of the first lens group G1 will now be explained in further detail. In order to have a large aperture, the first lens group G1 should strongly refract light, and in order to reduce aberration produced on each of lens surfaces, a plurality of positive lenses should be arranged to disperse power. Also, if a movable lens group is disposed in a lens system like in an inner focusing type lens system, it is preferable that lens groups respectively correct chromatic aberrations. Accordingly, the first lens group G1 includes three positive lenses and one negative lens. In detail, the negative lens 4 may be disposed on an image side I of the third positive lens 3 as shown in FIG. 1, or the negative lens 3 may be disposed between the second positive lens 2 and the third positive lens 4 as shown in FIGS. 4, 7, and 10. The latter configuration of FIGS. 4, 7, and 10, in which a positive lens 1 having an object side surface whose curvature is greater than that of an image side surface, a positive meniscus lens 2 having a convex surface at an object side O, a negative meniscus lens 3 having a convex surface at the object side O, and a positive lens 4 having an object side surface whose curvature is greater than that of an image side surface, which are arranged sequentially from the object side O, can correct chromatic aberration of spherical aberration.

Lens data for the lens systems according to the various embodiments of the present invention will now be explained. Hereinafter, f denotes the focal length of a lens system, Fno denotes an F-number, R denotes a radius of curvature, D denotes the center thickness of a lens or a distance between lenses, Nd denotes a refractive index, Vd denotes an Abbe number, B.F. denotes a back focal length, and St denotes a stop.

Embodiment 1

FIG. 1 is a cross-sectional view of a lens system according to an embodiment of the present invention. In FIG. 1, the lens system further includes a filter 11. Design data for the lens system of FIG. 1 is shown below.

| f = 84.95 Fno = 1.44 | | | | |
|---|---|---|---|---|
| Lens surface | R | D | Nd | Vd |
| S1 | 194.328 | 5.142 | 1.61800 | 63.4 |
| S2 | −503.431 | 0.100 | | |
| S3 | 57.278 | 8.976 | 1.49700 | 81.6 |
| S4 | 590.419 | 0.100 | | |
| S5 | 39.122 | 8.408 | 1.72916 | 54.7 |
| S6 | 108.077 | 1.520 | | |
| S7 | 166.262 | 2.500 | 1.68893 | 31.2 |
| S8 | 30.270 | 10.960 | | |
| S9 | −118.006 | 3.050 | 1.84666 | 23.8 |
| S10 | −61.142 | 1.800 | 1.54072 | 47.2 |

-continued f = 84.95 Fno = 1.44

| | | | | |
|---|---|---|---|---|
| S11 | 39.859 | 19.349 | | |
| S12 | ST | 3.180 | | |
| S13 | −98.407 | 2.000 | 1.69895 | 30.1 |
| S14 | 50.395 | 6.683 | 1.80420 | 46.5 |
| S15 | −67.563 | 0.200 | | |
| S16 | 57.545 | 3.726 | 1.80420 | 46.5 |
| S17 | 379.253 | 35.864 | | |
| S18 | Infinity | 3.700 | 1.51680 | 64.2 |
| S19 | Infinity | 0.733 | | |

| | Magnification | | |
|---|---|---|---|
| | 0.000 | 0.02 | 0.130 |
| D(8) | 10.960 | 12.928 | 24.394 |
| D(11) | 19.349 | 17.378 | 5.915 |
| B.F. | 0.733 | 0.733 | 0.733 |

Figure 2:
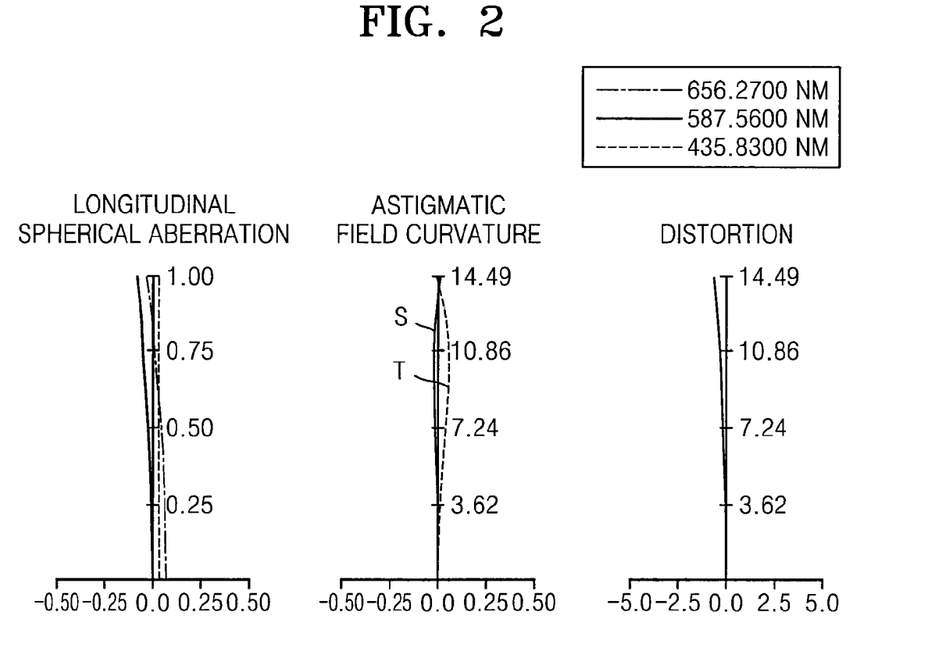
FIG. 2 illustrates the spherical aberration, astigmatic field curvature, and distortion of the lens system of FIG. 1.
Figure 3:
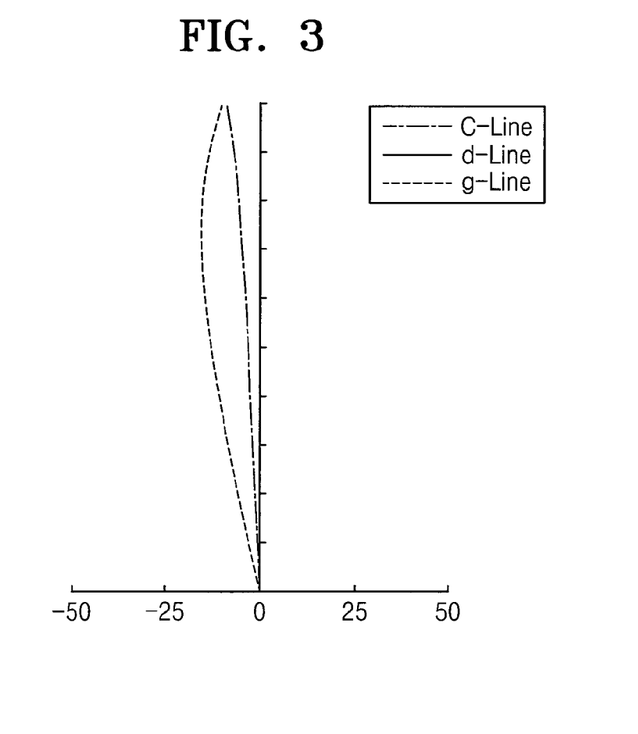
FIG. 3 illustrates the lateral chromatic aberration of the lens system of FIG. 1.

FIG. 2 illustrates the spherical aberration, astigmatic field curvature, and distortion of the lens system of FIG. 1. The astigmatic field curvature is indicated by a tangential field curvature T and a sagittal field curvature S. FIG. 3 illustrates the lateral chromatic aberration of the lens system of FIG. 1. The lateral chromatic aberration is indicated by a C-line and a g-line with respect to a Fraunhofer d-line (vertical axis).

Embodiment 2

FIG. 4 is a cross-sectional view of a lens system according to another embodiment of the present invention. Design data for the lens system of FIG. 4 is shown below.

f = 84.98 Fno = 1.44

| Lens surface | R | D | Nd | Vd |
|---|---|---|---|---|
| S1 | 67.992 | 10.010 | 1.61800 | 63.4 |
| S2 | −644.661 | 0.100 | | |
| S3 | 44.293 | 7.612 | 1.77250 | 49.6 |
| S4 | 107.011 | 2.811 | | |
| S5 | 423.656 | 4.402 | 1.67270 | 32.2 |
| S6 | 31.691 | 2.365 | | |
| S7 | 39.549 | 7.879 | 1.49700 | 81.6 |
| S8 | −1892.483 | 2.886 | | |
| S9 | −169.586 | 3.816 | 1.84666 | 23.8 |
| S10 | −54.935 | 1.800 | 1.60562 | 43.7 |
| S11 | 29.224 | 13.654 | | |
| S12 | ST | 5.246 | | |
| S13 | −32.920 | 2.000 | 1.68893 | 31.2 |
| S14 | 88.868 | 6.850 | 1.80420 | 46.5 |
| S15 | −40.746 | 0.100 | | |
| S16 | 76.063 | 4.128 | 1.80420 | 46.5 |
| S17 | −172.864 | 35.864 | | |
| S18 | Infinity | 3.700 | 1.51680 | 64.2 |
| S19 | Infinity | 0.726 | | |

| | Magnification | | |
|---|---|---|---|
| | 0.000 | 0.020 | 0.124 |
| D(8) | 2.886 | 3.948 | 9.713 |
| D(11) | 13.654 | 12.592 | 6.827 |
| B.F. | 0.726 | 0.726 | 0.726 |

Figure 5:
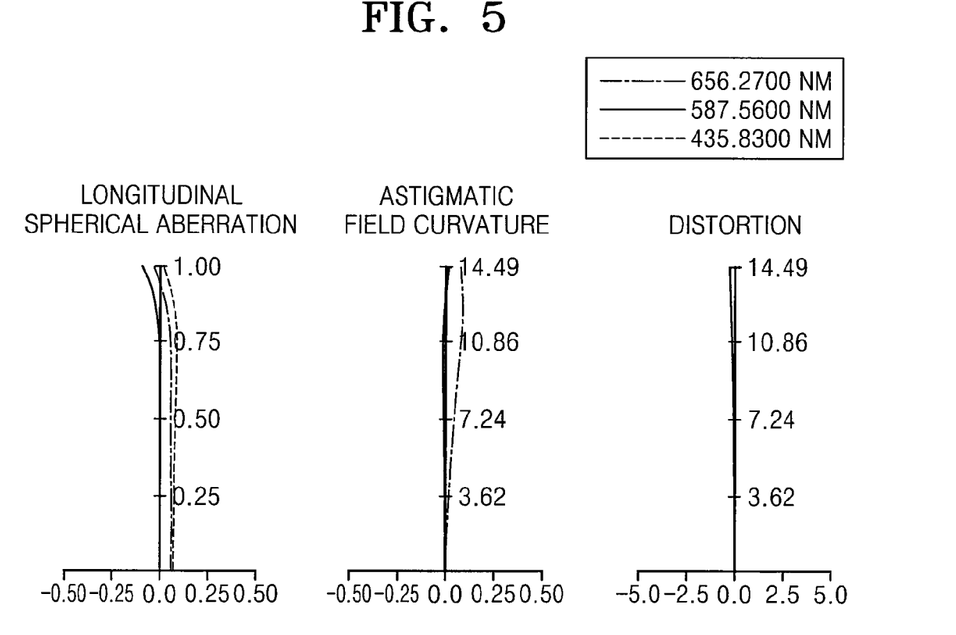
FIG. 5 illustrates the spherical aberration, astigmatic field curvature, and distortion of the lens system of FIG. 4.
Figure 6:
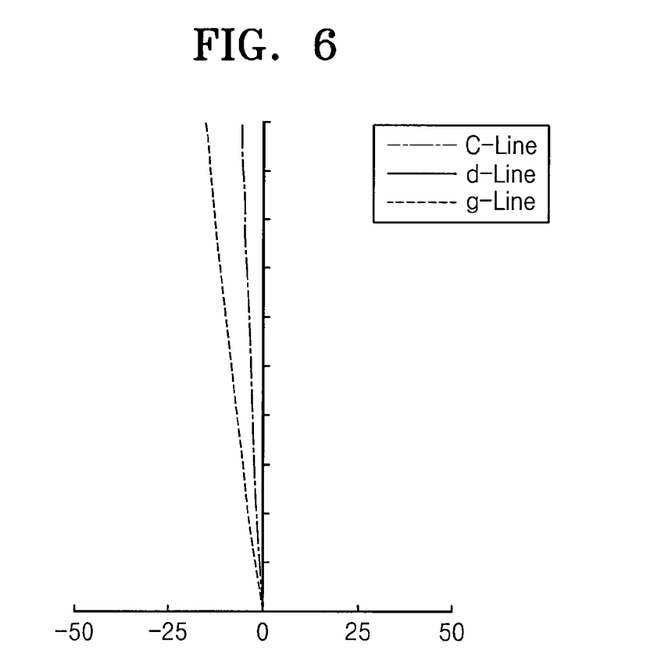
FIG. 6 illustrates the lateral chromatic aberration of the lens system of FIG. 4.

FIGS. 5 and 6 illustrate the spherical aberration, astigmatic field curvature, and distortion, and lateral chromatic aberration of the lens system of FIG. 4.

Embodiment 3

FIG. 7 is a cross-sectional view of a lens system according to another embodiment of the present invention. Design data for the lens system of FIG. 7 is shown below.

f = 84.11 Fno = 1.44

| Lens surface | R | D | Nd | Vd |
|---|---|---|---|---|
| S1 | 74.133 | 9.170 | 1.61800 | 63.4 |
| S2 | −717.758 | 0.100 | | |
| S3 | 41.946 | 9.890 | 1.80420 | 46.5 |
| S4 | 122.418 | 1.270 | | |
| S5 | 232.638 | 2.500 | 1.69895 | 30.1 |
| S6 | 30.270 | 2.060 | | |
| S7 | 37.178 | 7.910 | 1.49700 | 81.6 |
| S8 | 231.052 | 4.008 | | |
| S9 | −372.945 | 4.360 | 1.84666 | 23.8 |
| S10 | −53.200 | 1.800 | 1.74400 | 44.9 |
| S11 | 30.337 | 13.552 | | |
| S12 | ST | 4.510 | | |
| S13 | −42.944 | 2.570 | 1.69895 | 30.1 |
| S14 | 51.699 | 7.740 | 1.80420 | 46.5 |
| S15 | −43.140 | 0.100 | | |
| S16 | 56.745 | 4.040 | 1.80420 | 46.5 |
| S17 | 1000.000 | 36.970 | | |
| S18 | Infinity | 2.500 | 1.51680 | 64.2 |
| S19 | Infinity | 0.528 | | |

| | Magnification | | |
|---|---|---|---|
| | 0.000 | 0.020 | 0.129 |
| D(8) | 4.008 | 5.004 | 10.603 |
| D(11) | 13.552 | 12.557 | 6.957 |
| B.F. | 0.528 | 0.528 | 0.528 |

Figure 8:
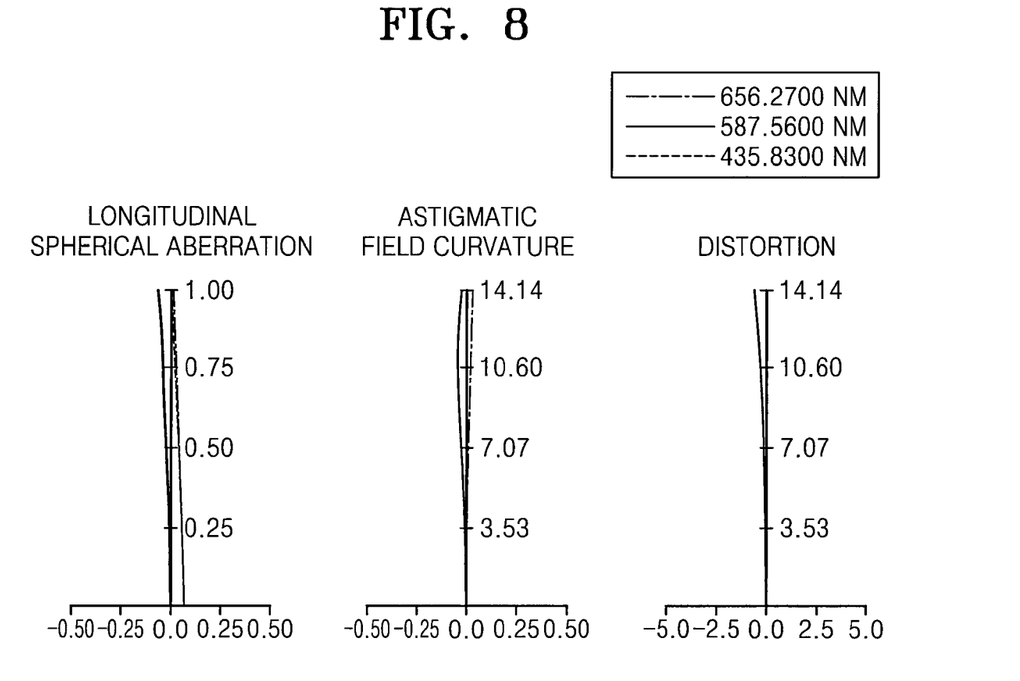
FIG. 8 illustrates the spherical aberration, astigmatic field curvature, and distortion of the lens system of FIG. 7.
Figure 9:
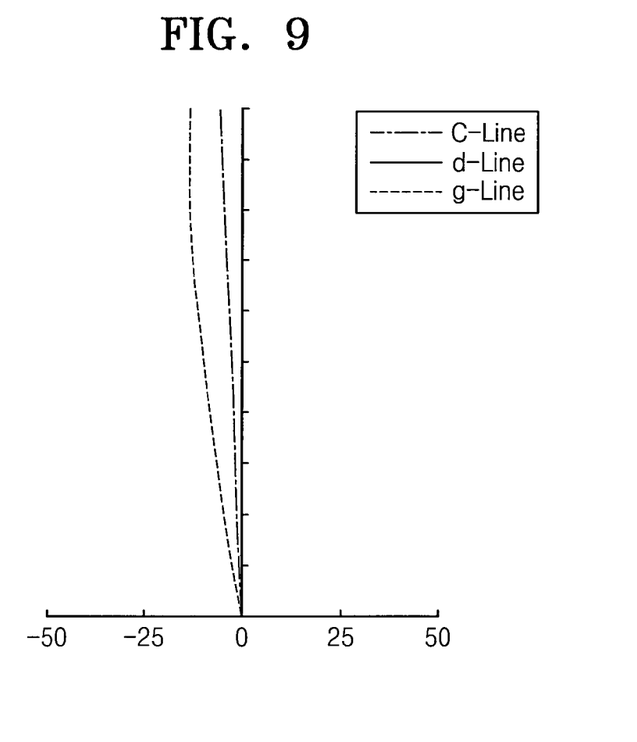
FIG. 9 illustrates the lateral chromatic aberration of the lens system of FIG. 7.

FIGS. 8 and 9 illustrate the spherical aberration, astigmatic curvature, and distortion, and lateral chromatic aberration of the lens system of FIG. 7.

Embodiment 4

FIG. 10 is a cross-sectional view of a lens system according to another embodiment of the present invention. Design data for the lens system of FIG. 10 is shown below.

f = 84.02 Fno = 1.44

| Lens surface | R | D | Nd | Vd |
|---|---|---|---|---|
| S1 | 82.461 | 9.106 | 1.61800 | 63.4 |
| S2 | −353.881 | 0.100 | | |
| S3 | 40.112 | 9.848 | 1.80420 | 46.5 |
| S4 | 147.822 | 0.778 | | |
| S5 | 224.791 | 2.500 | 1.71736 | 29.5 |
| S6 | 29.131 | 2.047 | | |
| S7 | 35.404 | 6.484 | 1.49700 | 81.6 |
| S8 | 81.451 | 6.041 | | |
| S9 | −148.610 | 3.683 | 1.84666 | 23.8 |
| S10 | −52.435 | 1.800 | 1.64850 | 53.0 |
| S11 | 32.325 | 14.849 | | |
| S12 | Infinity | 4.307 | | |
| S13 | −47.483 | 2.382 | 1.72825 | 28.3 |
| S14 | 61.565 | 7.266 | 1.81600 | 46.6 |
| S15 | −44.230 | 0.100 | | |
| S16 | 56.697 | 4.088 | 1.80420 | 46.5 |

-continued

| f = 84.02 Fno = 1.44 | | | | |
|---|---|---|---|---|
| S17 | 1000.000 | 37.010 | | |
| S18 | Infinity | 2.500 | 1.51680 | 64.2 |
| S19 | Infinity | 0.500 | | |

| | Magnification | | |
|---|---|---|---|
| | 0.000 | 0.020 | 0.130 |
| D(8) | 6.041 | 7.236 | 14.070 |
| D(11) | 14.849 | 13.653 | 6.819 |
| B.F. | 0.500 | 0.500 | 0.500 |

Figure 11:
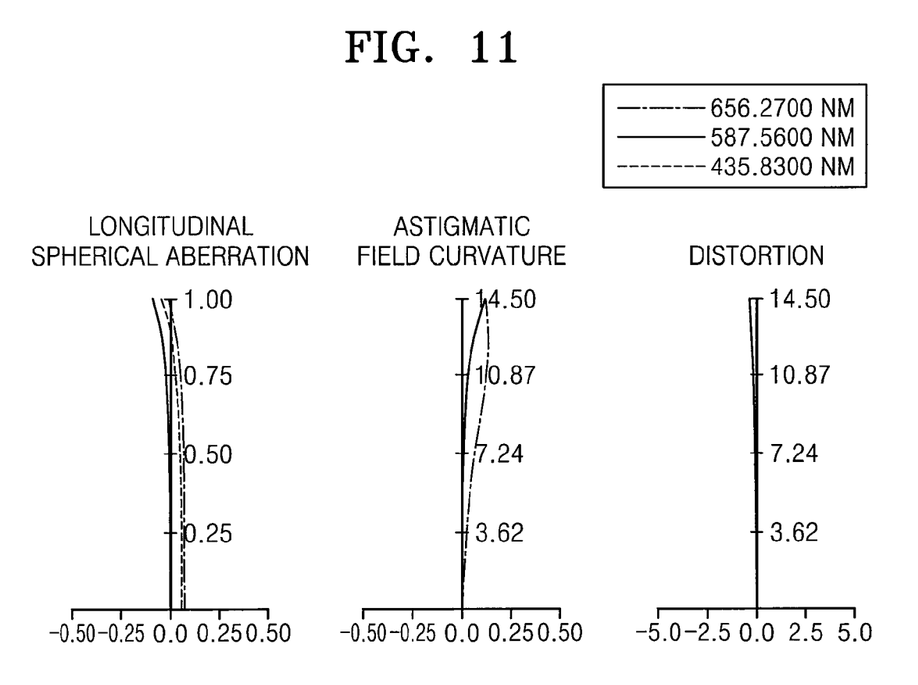
FIG. 11 illustrates the spherical aberration, astigmatic field curvature, and distortion of the lens system of FIG. 10.
Figure 12:
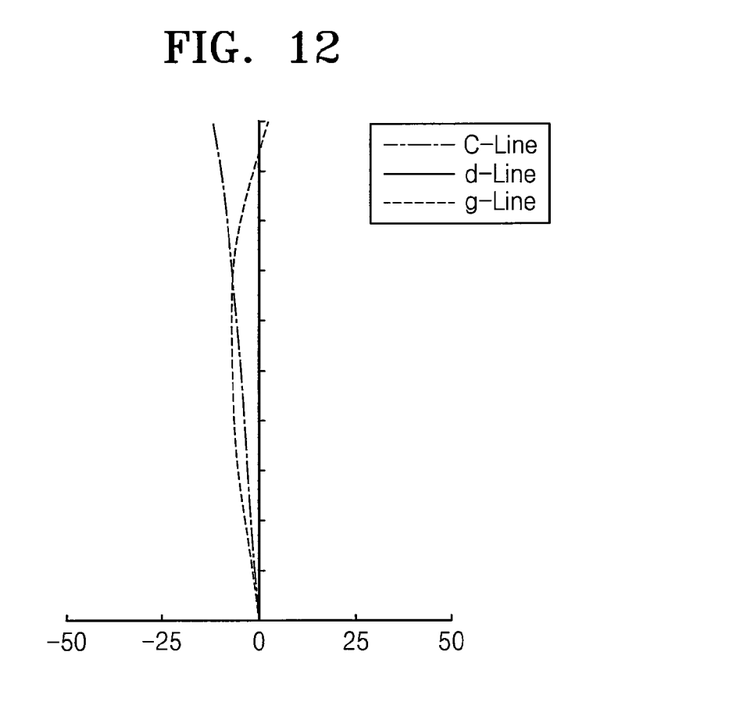
FIG. 12 illustrates the lateral chromatic aberration of the lens system of FIG. 10.

FIGS. 11 and 12 illustrate the spherical aberration, astigmatic curvature, and distortion, and lateral chromatic aberration of the lens system of FIG. 10.

As described above, the lens system according to the present invention can reduce the weight of a focusing lens group by allowing the focusing lens group to include only two lenses and can correct aberration occurring in lens groups other than the focusing lens group when focusing is performed by moving the focusing lens group.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A telephoto lens system comprising a first lens group having a positive refractive power, a second lens group having a negative refractive power, and a third lens group having a positive refractive power, which are arranged sequentially from an object side, wherein the first lens group comprises three positive lenses and one negative lens, the second lens group comprises a doublet lens made up of a positive lens and a negative lens, and the third lens group comprises a doublet lens made up of a negative lens with a concave surface toward the object side and a positive lens, and a positive lens, which are arranged sequentially from the object side, the telephoto lens system satisfying $0.450 < f_3/f < 0.630$ where f denotes the focal length of the lens system when the lens system is focused on an object at an infinite distance, and $f_3$ denotes the focal length of the third lens group;

wherein, when np denotes the refractive index of each of the three positive lenses of the first lens group, each of the three positive lenses comprises, without any overlap, one of three materials respectively satisfying $1.42 < np < 1.50$, $1.55 < np < 1.65$, and $1.70 < np < 1.85$.

2. The telephoto lens system of claim 1, satisfying $$0.35 < \frac{1}{f}\left|\frac{n_{3-1}-1}{r_{3-1}}\right| < 2.30$$

where $n_{3-1}$ denotes the refractive index of the negative lens of the third lens group which is closest to the object side, and $r_{3-1}$ denotes the radius of curvature of the concave surface toward the object side of the negative lens of the third lens group which is closest to the object side.

3. The telephoto lens system of claim 1, wherein focusing is performed by moving the second lens group along an optical axis.

4. A telephoto lens system comprising a first lens group having a positive refractive power, a second lens group having a negative refractive power, and a third lens group having a positive refractive power, which are arranged sequentially from an object side, wherein the first lens group comprises three positive lenses and one negative lens, the second lens group comprises a doublet lens made up of a positive lens and a negative lens, and the third lens group comprises a doublet lens made up of a negative lens with a concave surface toward the object side and a positive lens, and a positive lens, which are arranged sequentially from the object side, the telephoto lens system satisfying $0.450 < f_3/f < 0.630$ where f denotes the focal length of the lens system when the lens system is focused on an object at an infinite distance, and $f_3$ denotes the focal length of the third lens group;

wherein the first lens group comprises a positive lens having an object side surface whose curvature is greater than that of an image side surface, a positive meniscus lens having a convex surface at the object side, a negative meniscus lens having a convex surface at the object side, and a positive lens having an object side surface whose curvature is greater than that of an image side surface, which are arranged sequentially from the object side.

5. The telephoto lens system of claim 4, satisfying $$0.35 < \frac{|f_2|}{f} < 0.65$$

where f2 denotes the focal length of the second lens group.

6. A telephoto lens system comprising a first lens group having a positive refractive power, a second lens group having a negative refractive power, and a third lens group having a positive refractive power, which are arranged sequentially from an object side, wherein focusing is performed by moving the second lens group along an optical axis, the first lens group comprises a positive lens having an object side surface whose curvature is greater than that of an image side surface, a positive meniscus lens having a convex surface at the object side, a negative meniscus lens having a convex surface at the object side, and a positive lens having an object side surface whose curvature is greater than that of an image side surface, which are arranged sequentially from the object side, the second lens group comprises a doublet lens made up of a positive lens and a negative lens, and the third lens group comprises a doublet lens made up of a negative lens with a concave surface at the object side and a positive lens, and a positive lens, which are arranged sequentially from the object side;

wherein, when np denotes the refractive index of each of the three positive lenses of the first lens group, each of the three positive lenses comprises, without any overlap, one of three materials respectively satisfying $1.42 < n_p < 1.50$, $1.55 < n_p < 1.65$, and $1.70 < n_p < 1.85$.

7. The telephoto lens system of claim 6, satisfying $$0.35 < f \left| \frac{n_{3-1} - 1}{r_{3-1}} \right| < 2.30$$

where $n_{3-1}$ denotes the refractive index of the negative lens of the third lens group which is closest to the object side, and $r_{3-1}$ denotes the radius of curvature of the concave surface toward the object side of the negative lens of the third lens group which is closest to the object side.

8. A telephoto lens system comprising a first lens group having a positive refractive power, a second lens group having a negative refractive power, and a third lens group having a positive refractive power, which are arranged sequentially from an object side,
wherein focusing is performed by moving the second lens group along an optical axis, the first lens group comprises a positive lens having an object side surface whose curvature is greater than that of an image side surface, a positive meniscus lens having a convex surface at the object side, a negative meniscus lens having a convex surface at the object side, and a positive lens having an object side surface whose curvature is greater than that of an image side surface, which are arranged sequentially from the object side, the second lens group comprises a doublet lens made up of a positive lens and a negative lens, and the third lens group comprises a doublet lens made up of a negative lens with a concave surface at the object side and a positive lens, and a positive lens, which are arranged sequentially from the object side;

satisfying $$0.35 < \frac{|f_2|}{f} < 0.65$$

where f2 denotes the focal length of the second lens group.

* * * * *

UNITED STATES PATENT AND TRADEMARK OFFICE
CERTIFICATE OF CORRECTION

PATENT NO.       : 7,791,824 B2
APPLICATION NO.  : 12/424004
DATED            : September 7, 2010
INVENTOR(S)      : Shuji Yoneyama It is certified that error appears in the above-identified patent and that said Letters Patent is hereby corrected as shown below:

IN THE CLAIMS:

In Claim 2, Column 9, line 64, replace $$0.35 < \frac{1}{f} \left| \frac{n_{3-1} - 1}{r_{3-1}} \right| < 2.30$$

with $$0.35 < f \left| \frac{n_{3-1} - 1}{r_{3-1}} \right| < 2.30$$

Signed and Sealed this
Eighth Day of February, 2011

David J. Kappos
*Director of the United States Patent and Trademark Office*